United States Patent
Lovley et al.

(10) Patent No.: US 8,283,076 B2
(45) Date of Patent: Oct. 9, 2012

(54) MICROBIAL FUEL CELLS

(75) Inventors: Derek R. Lovley, Bernardston, MA (US); Kelly P. Nevin, Pelham, MA (US); Minjuan Zhang, Ann Arbor, MI (US); Hongfei Jia, Ann Arbor, MI (US)

(73) Assignees: Toyota Motor Engineering & Manufacturing North America, Inc., Erlanger, KY (US); University of Massachusetts, Boston, MA (US)

( * ) Notice: Subject to any disclaimer, the term of this patent is extended or adjusted under 35 U.S.C. 154(b) by 1289 days.

(21) Appl. No.: 11/750,583

(22) Filed: May 18, 2007

(65) Prior Publication Data
US 2008/0286624 A1   Nov. 20, 2008

(51) Int. Cl.
*H01M 8/16* (2006.01)
(52) U.S. Cl. ......... 429/401; 429/2; 429/523; 435/252.1; 435/243
(58) Field of Classification Search ............... 435/252.1, 435/243; 429/2, 401, 523
See application file for complete search history.

(56) References Cited

U.S. PATENT DOCUMENTS

| | | | |
|---|---|---|---|
| 5,976,719 | A | 11/1999 | Kim et al. |
| 6,913,854 | B1 | 7/2005 | Alberte et al. |
| 2004/0241528 | A1 | 12/2004 | Chiao et al. |
| 2005/0208343 | A1 | 9/2005 | Kim et al. |
| 2005/0255345 | A1 | 11/2005 | Gerritse et al. |
| 2007/0134520 | A1 * | 6/2007 | Shimomura et al. ............ 429/2 |
| 2010/0178530 | A1 * | 7/2010 | Min et al. ............ 429/2 |
| 2010/0227203 | A1 * | 9/2010 | Ter Heijne et al. ............ 429/2 |

FOREIGN PATENT DOCUMENTS

WO   WO 2005005981 A2 *   1/2005

OTHER PUBLICATIONS

Thomas, L.V., et al "Spatial interaction between subsurface bacterial colonues in a model system: a territory model describing the inhibition of *Listeria monocytogenes* by nisisn-producing lactic acid bacteria", Microbiology, 1997, 143, (2575-2582).*
Power boosted 10-fold in microbial cell, Fuel Cell Bull., 2006, 8, 7-8.*
Bruce E. Logan et al.; Microbial Fuel Cells: Methodology and Technology; Env. Sci. & Tech.; Amer. Chem. Soc.; vol. 40, No. 17; 2006; p. 5181-5192.

(Continued)

*Primary Examiner* — Patrick Ryan
*Assistant Examiner* — Alex Usyatinsky
(74) *Attorney, Agent, or Firm* — Gifford, Krass, Sprinkle, Anderson & Citkowski, P.C.

(57) ABSTRACT

A microbial fuel cell is provided according to embodiments of the present invention including electricigenic microbes containing at least about 0.075 milligrams of protein per square centimeter of the anode surface area. In particular embodiments, the electricigenic microbes are disposed on the anode such that at least about 90% of the portion of the anode surface area has a layer of electricigenic microbes, the layer greater than about 1 micron in thickness. This thickness is indicative of the layer including at least a first stratum of electricigenic microbes in direct contact with the anode and a second stratum of electricigenic microbes in direct contact with the first stratum such that the second stratum is in indirect contact with the anode.

12 Claims, 6 Drawing Sheets

OTHER PUBLICATIONS

Hong Liu et al.; Electricity Generation Using an Air-Cathode Single Chamber Microbial Fuel Cell in the Presence and Absence of a Proton Exchange Membrane; Env. Sci. & Tech.; Amer. Chem. Soc.; vol. 38, No. 14; 2004; p. 4040-4046.

Shaoan Cheng et al.; Increased Power Generation in a Continuous Flow MFC with Advective Flow through the Porous Anode and Reduced Electrode Spacing; Env. Sci. & Tech.; Amer. Chem. Soc.; vol. 40, No. 7; 2006; p. 2426-2432.

Derek R. Lovley; Bug juice: harvesting electricity with microorganisms; Nature Reviews; vol. 4; Jul. 2006; p. 497-508.

Gemma Reguera et al.; Biofilm and Nanowire Production Leads to Increased Current in *Geobacter sulfurreducens* Fuel Cells; Appl. and Env. Microbiology; Amer. Soc. For Microbiology; vol. 72, No. 11; Nov. 2006; p. 7345-7348.

Derek R. Lovley; Microbial fuel cells: novel microbial physiologies and engineering approaches; Current Opinion in Biotechnology; 2006; 17:327-332.

Zhen He et al; Electricity Generation from Artificial Wastewater Using an Uoflow Microbial Fuel Cell; Env. Sci. & Tech.; Amer. Chem. Soc.; vol. 39, No. 14; 2005 p. 5262-5267.

Bradley R. Ringeisen et al.; High Power Density from a Miniature Microbial Fuel Cell Using *Shewanella oneidensis* DSP10; Env. Sci. & Tech.; vol. 40, No. 8; 2006; p. 2629-2634.

Peter Aelterman et al.; Continuous Electricity Generation at High Voltages and Currents Using Stacked Microbial Fuel Cells; Env. Sci. & Tech.; Amer. Chem. Soc.; vol. 40, No. 10, 2006; p. 3388-3394.

Shaoan Cheng et al.; Increased performance of single-chamber microbial fuel cells using an improved cathode structure; Electrochemistry Communications 8; 2006; p. 489-494.

Jae Kyung Jang et al.; Construction and operation of a novel mediator- and membrane-less microbial fuel cell; Process Biochemistry; 39; 2004; p. 1007-1012.

Korneel Rabaey et al.; A microbial fuel cell capable of converting glucose to electricity at high rate and efficiency; Biotechnology Letters; 25; p. 1531-1535.

\* cited by examiner

| Fuel Cell Configuration | Current Density (mA/m² anode Surface Area) | Current Density (A/m³ anode Volume) | Power Density (mW/m² of anode Surface area) | Power Density (W/m³ of anode Volume) |
|---|---|---|---|---|
| H-Cell FeCN | 124 | 4 | 55.6 | 1.80 |
| Compact Air Cathode | 582 | 120 | 245 | 45.2 |
| Compact FeCN | 2663 | 140 | 1281 | 59.0 |

MICROBIAL FUEL CELLS

FIELD OF THE INVENTION

The present invention relates generally to fuel cells. More particularly, the present invention relates to microbial fuel cells.

BACKGROUND OF THE INVENTION

Clean and efficient energy production from renewable resources is highly desired due to the concurrent rapid increases in both energy demand and environmental concerns. Of particular interest are microbial fuel cells in which microorganisms act as biocatalysts, consuming oxidizable organic material containing chemical energy and producing other useful energy forms, such as electricity.

Ongoing research in the area of microbial fuel cells has resulted in development of various microbial fuel cell arrangements. However, such microbial fuel cells are generally unsatisfactory, producing low power density and low efficiency of conversion of a microbial nutrient fuel to useful energy, such that microbial fuel cells have so far been limited in production and application.

There is a continuing need for improved microbial fuel cells.

SUMMARY OF THE INVENTION

A microbial fuel cell is provided according to embodiments of the present invention which includes an anode having an anode surface area, a cathode having a cathode surface area, a cation exchange membrane disposed between the anode and the cathode, and a plurality of electricigenic microbes disposed on the anode. The plurality of electricigenic microbes form a plurality of colonies spaced from each other improving a mass transfer of the plurality of electricigenic microbes increasing a power density of the microbial fuel cell.

In particular embodiments, the plurality of electricigenic microbes is a plurality of Geobacteraceae microbes. Optionally, the plurality of electricigenic microbes is a substantially pure population of electricigenic microbes. In further embodiments, the plurality of electricigenic microbes is a substantially pure population of Geobacter sulfurreducens.

A microbial fuel cell is provided according to embodiments of the present invention which includes an anode having an anode surface area, a cathode having a cathode surface area, a cation exchange membrane disposed between the anode and the cathode, and a plurality of electricigenic microbes disposed on the anode. The plurality of electricigenic microbes form a plurality of colonies having pillars spaced from each other improving a mass transfer of the plurality of electricigenic microbes increasing a power density of the microbial fuel cell.

The plurality of electricigenic microbes may be disposed on the anode such that they form a biofilm having a thickness greater than about 1 micron, indicative of the layer including at least a first portion of the plurality of electricigenic microbes in direct contact with the anode and a second portion of the plurality of electricigenic microbes in direct contact with the first portion of the electricigenic microbes and thereby in indirect contact with the anode.

BRIEF DESCRIPTION OF THE DRAWINGS

FIG. 8 is taken directly from Reguera, G., Nevin, K.P., Nicoll, J.S., Covalla, S. F., Eoodard, T. L. and Lovley, D. R. 2006 Biofilm and nanowire production leads to increased current in Geobacter sulfurreducens Fuel Cells, Appl. Environ. Microbiol. 72:7345-7348.

DETAILED DESCRIPTION OF THE PREFERRED EMBODIMENTS

Figure 1:
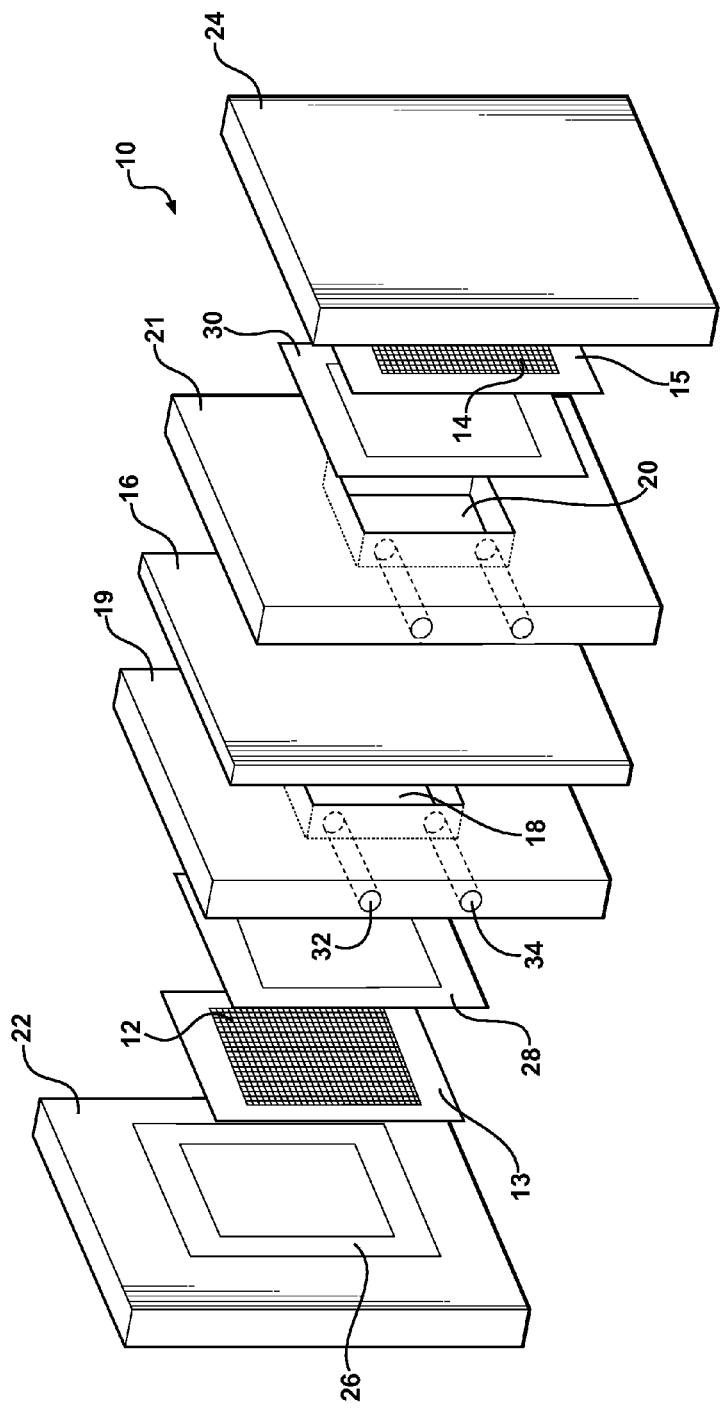
FIG. 1 shows an exploded diagram of an exemplary embodiment of a fuel cell according to the present invention.

Fuel cells are provided according to the present invention which are useful in numerous applications for providing power illustratively including powering portable devices illustratively including communications devices such as telephones and pagers; portable electronic devices such as computers, personal digital assistants, personal audio players, cameras, and electronic game players; residential power generation devices; sensors; and vehicles such as automobiles, trucks, and motorcycles.

Broadly described, a microbial fuel cell includes an anode, a cathode and a cation exchange membrane. In operation, microbes digest oxidizable organic material, producing carbon dioxide, protons and electrons. The electrons are transferred to the anode and then, through a load, to the cathode. Protons pass through the cation exchange membrane to the cathode. At the cathode, an oxidant, such as oxygen, reacts with the protons and electrons to form water.

In an example in which glucose is the oxidizable organic material and oxygen is the oxidant, the half cell reactions are:

Anode: $C_6H_{12}O_6 + 6H_2O \rightarrow 6CO_2 + 24H^+ + 24e^-$

Cathode: $6O_2 + 24H^+ + 24\ e^- \rightarrow 12H_2O$

Electricigens are anaerobic microbes included in embodiments of fuel cells according to the present invention which oxidize organic material completely to carbon dioxide and which donate electrons directly to an anode. This contrasts with microbes which produce reduced end-products or reduce redox mediators, such as thionin or neutral red, indirectly donating electrons to the anode. Since electricigens transfer electrons directly to the anode, no "redox mediator" is necessary. In addition, many non-electricigens only incompletely oxidize an organic material used as a fuel in a microbial fuel cell, resulting in low efficiencies of conversion of the fuel to electricity.

An oxidizable organic material provided as a source of fuel in operation of an inventive fuel cell is any organic material capable of being metabolized to carbon dioxide by an electricigen. Examples of such organic materials include lower molecular weight carboxylic acids such as acetate, butyrate and propionate; carbohydrates including monosaccharides such as glucose and oligo- and polysaccharides such as starch and cellulose; alcohols including aliphatic alcohols such as methanol, ethanol, propanol and butanol; an amino acid such as cysteine; a peptide or protein; and a combination of any of these. In addition, complex mixtures of organic materials such as solid waste and wastewater may be used as a fuel in particular embodiments.

Particular electricigens, also called electricigenic microbes herein, include organisms in the family *Geobacteraceae* including organisms from any of the genera *Geobacter*, *Desulfuromonas*, *Desulfuromusa*, *Pelobacter* and *Malonomonas* which are capable of oxidizing organic fuel compounds completely to carbon dioxide and capable of dissimilatory Fe(III) reduction.

A particular electricigen included in embodiments of fuel cells according to the present invention is *Geobacter sulfurreducens*. For example, *Geobacter sulfurreducens* wherein the type strain is strain PCA having ATCC Number 51573 and identified as DSM 12127, described in Caccavo, F., et al., Appl. Environ. Microbiol., 1994, 60, 3752-3759 is a particular electricigen included in embodiments of fuel cells according to the present invention.

Further examples of electricigens included in embodiments of fuel cells according to the present invention include, but are not limited to, *Geobacter metallireducens*, type species of the genus, wherein the type strain is strain GS-15 having ATCC Number 53774, identified as DSM 7210, and described in Lovley, D. R., et al., Arch. Microbiol., 1993, 159, 336-344; *Geobacter argillaceus* wherein the type strain is strain G12 having ATCC Number BAA-1139 and also identified as JCM 12999, described in Shelobolina, E. S. et al., Int. J. Syst. Evol. Microbiol., 2007, 57, 126-135; *Geobacter bemidjiensis* wherein the type strain is strain Bem having ATCC Number BAA-1014, and also identified as DSM 16622 and JCM 12645 and described in Nevin, K. P. et al., Int. J. Syst. Evol. Microbiol., 2005, 55, 1667-1674; *Geobacter bremensis* wherein the type strain is strain Dfr1 identified as DSM 12179 and as OCM 796 and described in Straub, K. L. and Buchholz-Cleven, B. E. E.), Int. J. Syst. Evol. Microbiol., 2001, 51, 1805-1808; *Geobacter chapellei* wherein the type strain is strain 172 having ATCC Number 51744 and identified as DSM 13688 and described in Coates, J. D., et al., Int. J. Syst. Evol. Microbiol. 2001, 51, 581-588; *Geobacter grbiciae* wherein the type strain is strain TACP-2 having ATCC Number BAA-45 and identified as DSM 13689 and described in Coates, J. D. et al., Int. J. Syst. Evol. Microbiol. 2001, 51, 581-588; *Geobacter hydrogenophilus* wherein the type strain is strain H-2 having ATCC Number 51590 and identified as DSM 13691 and described in Coates, J. D. et al., Int. J. Syst. Evol. Microbiol. 2001, 51, 581-588; *Geobacter pelophilus* wherein the type strain is strain Dft2, identified as DSM 12255 and as OCM 797, and described in Straub, K.L. and Buchholz-Cleven, B. E. E.), Int. J. Syst. Evol. Microbiol., 2001, 51, 1805-1808; *Geobacter pickeringii* wherein the type strain is strain G13 having ATCC Number BAA-1140 and identified as DSM 17153 and JCM 13000, described in Shelobolina, E. S. et al., Int. J. Syst. Evol. Microbiol., 2007, 57, 126-135; and *Geobacter psychrophilus* wherein the type strain is strain P35 having ATCC Number BAA-1013, identified as DSM 16674 and JCM 12644 and described in Nevin, K. P. et al., Int. J. Syst. Evol. Microbiol., 2005, 55, 1667-1674.

A plurality of electricigenic microbes is disposed on the anode in an inventive fuel cell according to embodiments of the present invention. In particular embodiments, a plurality of electricigenic microbes is a substantially pure population of an electricigen disposed on the anode in a fuel cell according to the present invention. The term "substantially pure" refers to a population of microbes wherein at least 95% of the microbes are electricigens of a specified genus or species. In particular embodiments, a substantially pure population of microbes included in a fuel cell according to the present invention refers to a population wherein at least 99% of the microbes are electricigens of a specified genus or species. In preferred embodiments, a substantially pure population of microbes disposed on the anode in a fuel cell according to the present invention refers to a population wherein at least 95% of the microbes are electricigens of the genus *Geobacter*. In still further preferred embodiments, a substantially pure population of microbes disposed on the anode in a fuel cell according to the present invention refers to a population wherein at least 95% of the microbes are electricigens of the species *Geobacter sulfurreducens*.

Electricigenic microbes are disposed on an anode in a fuel cell according to embodiments of the present invention by inoculating the anode with a substantially pure population of one or more species of isolated electricigenic microbe. The term "isolated" refers to electricigenic microbes separated from the environment in which the microbes are naturally found. Thus, for example, a microbe which naturally occurs in saltwater or freshwater sediment is an isolated microbe when separated from the saltwater or freshwater sediment and propagated in culture, resulting in a population of isolated microbes.

In particular embodiment of a fuel cell according to the present invention, at least a first portion of the plurality of electricigenic microbes disposed on an anode in a fuel cell is in direct contact with an anode, forming a biofilm having an average thickness of about the diameter of one microbe of the type in contact with the anode. It is an unexpected finding of the present invention that a biofilm having an average thickness indicative of presence of microbes disposed on the anode which are not in direct contact with the anode provides improved performance characteristics. Thus, in particular embodiments of a fuel cell provided according to the present invention, a second portion of the plurality of electricigenic microbes disposed on an anode in a fuel cell is in indirect contact with an anode. In such an arrangement, the individual microbes of the second plurality are in direct contact with one or more other individual microbes, forming a biofilm having an average thickness of at least about two times the diameter of one microbe of the type in contact with the anode. Thus, in particular embodiments, a biofilm on an anode included in a fuel cell according to the present invention has a thickness greater than about 1 microns. The thickness of a biofilm on an anode may be determined by any of various methods, including, for example, examination of the anode by microscopy.

Figure 9:
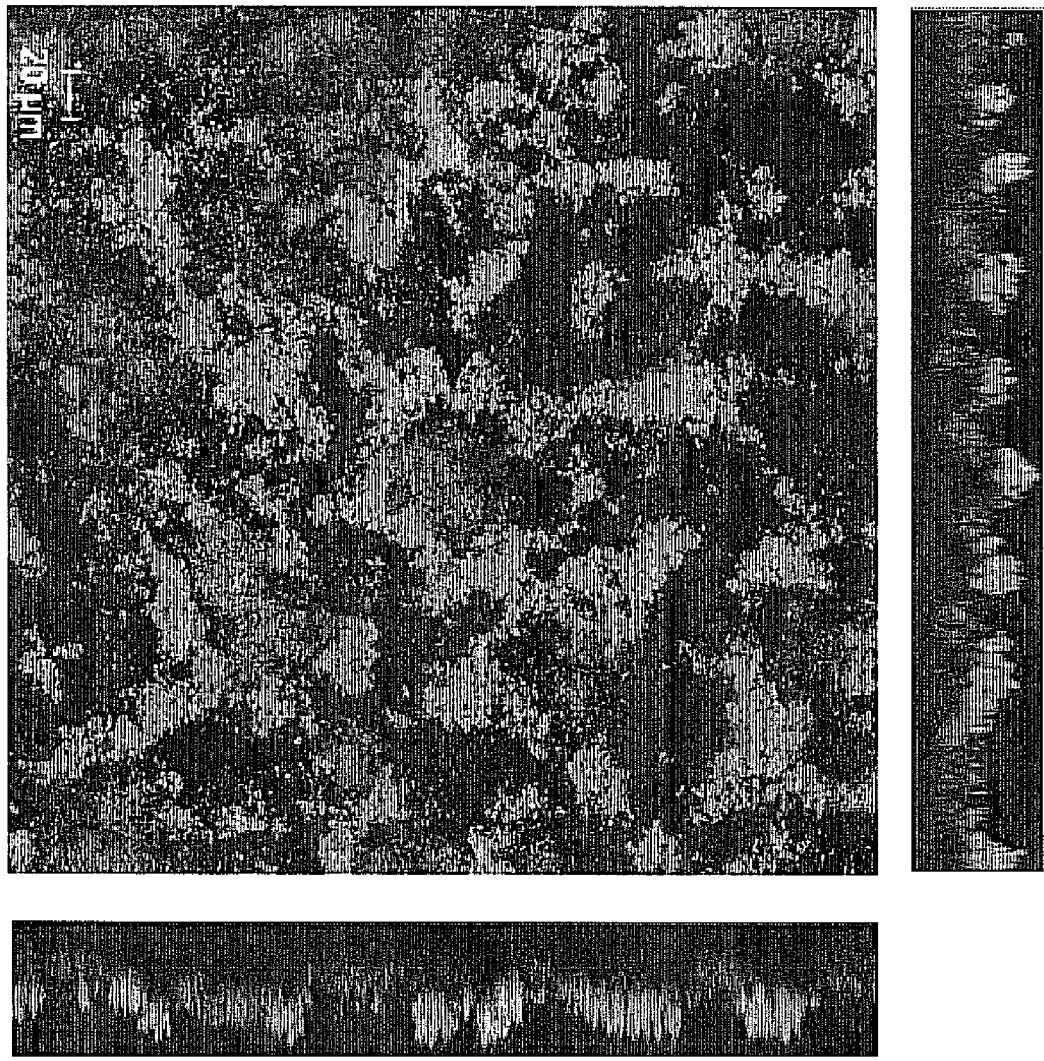
FIG. 9 is a confocal scanning laser microscopy of Geobacter sulfurreducens in a mini-stack microbial fuel cell on a solid graphite anode surface.

In one aspect, the plurality of includes a plurality of electricigenic microbes form colonies spaced from each other, as best seen in FIG. 9. The various colonies may form pillar structures having a heights of from 20 to 50 microns. The formation of spaced colonies improves a mass transfer of the plurality of electricigenic microbes leading to an improved power density of the microbial fuel cell. The colonies may have a spacing relative to each other in an amount of up to 40 microns.

As can be seen in FIG. 9, the lighter regions represent active colonies that are spaced from each other by the darker regions designating an empty space on the anode material. As indicated by the axial portions of the figure, the colonies form pillars having a varying height and are separated from each other.

In further embodiments, the thickness of a biofilm on an anode is described in terms of an amount of microbial protein present on the anode. Thus, in a particular embodiment of a fuel cell according to the present invention, in which at least a first portion of the plurality of electricigenic microbes disposed on an anode in a fuel cell is in direct contact with an anode, a biofilm formed on the anode has about 0.05 mg microbial protein or less per square centimeter of the surface area of the anode (Bond and Lovley, Appl. Environ, Microbiol. 2003, 69:1548-1555). In particular embodiments in which a second portion of the plurality of electricigenic microbes disposed on an anode in a fuel cell is in indirect contact with an anode, the biofilm formed on the anode has about 0.75 mg microbial protein or more per square centimeter of the surface area of the anode. Bacterial cells may contain in general $1.2 \times 10^{\wedge}-13$ g/cell of protein.

The amount of microbial protein of a biofilm on an anode is determined by any of various methods, including, for example, using standard protein assays illustratively including Lowrey assay and/or a bicinchoninic acid (BCA) method. Exemplary protein assay methods are described in detail in Lowry, O. H. et al., J. Biol. Chem. 193:265-275, 1951; Hartree, E. F., Anal Biochem 48:422-427, 1972; and Stoscheck, C. M., Quantitation of Protein, Methods in Enzymology 182: 50-69, 1990.

Electricigens included in particular embodiments of a fuel cell according to the present invention are characterized by presence of electrically conductive pili. Presence of pili is detected by visual assessment, such as by electron microscopic analysis. In addition, presence of pili is detected by assay for one or more pilus proteins and/or RNA encoding a pilus protein. A pilus protein is optionally detected by immunoassay, illustratively including Western blot, immunofluorescence detection, or immunoprecipitation, such as described in, for example, E. Harlow and D. Lane, Antibodies: A Laboratory Manual, Cold Spring Harbor Laboratory Press, 1988. A pilus protein may also be detected by mass spectrometry techniques, for instance mass spectrometric analysis of peptides following separation of proteins and digestion with an enzyme. Exemplary detailed descriptions of mass spectrometry methods for protein and/or peptide assay are found in Li J., et al., Clin Chem., 48(8);1296-304, 2002; Hortin, G. L., Clinical Chemistry 52: 1223-1237, 2006; Hortin, G. L., Clinical Chemistry 52: 1223-1237, 2006; A. L. Burlingame, et al. (Eds.), Mass Spectrometry in Biology and Medicine, Humana Press, 2000; and D. M. Desiderio, Mass Spectrometry of Peptides, CRC Press, 1990. Expression of a pilus protein is also detected by detection of mRNA encoding a pilus protein, illustratively including detection by RT-PCR, Northern blot and ribonuclease protection assay, as described in detail in J. Sambrook and D. W. Russell, Molecular Cloning: A Laboratory Manual, Cold Spring Harbor Laboratory Press; 3rd Ed., 2001; and F. M. Ausubel, Ed., Short Protocols in Molecular Biology, Current Protocols; 5th Ed., 2002. Nucleic acid sequences encoding pilus proteins have been characterized and specific assays including RT-PCR and primers for use in RT-PCR are described in detail in Childers, S. E. et al., Nature, 2002, 416(6882):767-9, for example.

Fuel Cell Configurations

A fuel cell according to the present invention, broadly described, includes an anode, a cathode, a cation exchange membrane disposed between the anode and cathode, and a population of electricigenic microbes disposed on the anode. The anode and cathode are connected by a conductive material such that electrons transferred to the anode pass to the cathode, for example through a load such as an electrically powered device.

An exemplary embodiment of a fuel cell according to the present invention is shown in FIG. 1. The illustrated fuel cell 10 includes an anode 12 in contact with an anode support 13, a cathode 14 in contact with a cathode support 15 and a cation exchange membrane 16 disposed between the anode 12 and the cathode 14. In this embodiment, the fuel cell has a two chamber configuration, including an anode chamber 18 defined in part by an anode chamber support 19 and a cathode chamber 20 defined in part by a cathode chamber support 21. Housing walls 22 and 24 support gaskets disposed between the walls and the anode and cathode respectively. One such gasket is shown at 26. Additional gaskets 28 and 30 are shown positioned between the anode support 13 and the anode chamber support 19, and between the cathode support 15 and the cathode chamber support 21, respectively. Inlet and outlet passages through the anode chamber support to the anode chamber are shown at 32 and 34, respectively. Optionally inlet and outlet passages are positioned elsewhere with respect to each other. For example, inlet and outlet passages are positioned on opposing sides of the anode and/or cathode chambers.

In particular embodiments, a microbial fuel cell according to the present invention is configured to include a single chamber microbial fuel cell having an anode compartment separated from an air cathode by a cation exchange membrane.

In particular embodiments of a fuel cell according to the present invention, the fuel cell is adapted to achieve a compact configuration. In such an embodiment, the electrodes and cation exchange membrane are sized and spaced relative to each other in order to achieve advantageous current power densities. In one aspect the current power density of a fuel cell may be from 100 mA/m$^2$ to 4.56 A/m$^2$.

An anode and/or cathode included in a fuel cell according to the present invention is electrically conductive. An included anode is substantially non-toxic to electricigenic microbes to be disposed on the anode.

Toxicity of a material, such as an anode, to electricigenic microbes is assessed by any standard assay illustratively including assessment using Rhodamine 123, propidium iodide, SYTO 9 and combinations of these or other microbe viability markers. Examples include those described in Kaprelyants, A. S. and Kell, D. B., J. Appl. Bacteriol., 72:410, 1992; and Gant, V. A. et al., J Med Microbiol 39:147-154, 1993, as well as LIVE/DEAD BacLight sold commercially by Invitrogen, Carlsbad, Calif.

Examples of suitable anode and cathode materials include, but are not limited to, graphite, porous graphite, packed graphite powder, carbon cloth, carbon felt, carbon paper, carbon wool, a conductive metal, a conductive polymer and combinations of any of these.

In particular embodiments, an anode included in a fuel cell according to the present invention is porous to fluid. Thus, during operation, a fluid containing an oxidizable organic material is optionally continuously supplied to the anode through flow channels in the anode present due to the porosity of the anode material.

A cathode included in a fuel cell according to the present invention is optionally placed in a liquid in particular embodiments. An oxidant gas, such as oxygen may be delivered to the cathode in the liquid. In particular embodiments, a cathode is immersed in a liquid containing a non-oxygen electron acceptor such as ferricyanide.

In further embodiments, a fuel cell according to the present invention includes an "air breathing" type cathode, also known as an "air cathode." A cathode includes a gas diffusion layer and a catalyst for catalysis of reduction of oxygen at the cathode. A gas diffusion layer is porous to gas, electron conductive and, typically, resistant to liquid passage. Carbon cloth and carbon paper are non-limiting examples of materials suitable for inclusion in a gas diffusion layer.

In particular embodiments, an air cathode includes a cation exchange membrane, catalyst and gas diffusion layer formed as an integral unit. For example, a catalyst is deposited on a gas diffusion layer and/or cation exchange membrane, and the assembled cation exchange membrane, catalyst and gas diffusion layer sandwich is heat treated, such as in a hot press, to form the air cathode.

A catalyst for catalysis of reduction of oxygen at the cathode is typically a metal catalyst, such as platinum. Further suitable catalyst metals illustratively include cobalt, copper, iron, nickel, palladium, tin, tungsten, as well as platinum group metals, or an alloy of any of these or other catalytic metals.

In general, a catalyst, such as platinum, is loaded on a conductive cathode material in amounts in the range of about 0.01 mg/cm$^2$-5.0 mg/cm$^2$, inclusive.

One or more current collectors are optionally included in a fuel cell according to embodiments of the present invention to conduct electrons to and from electrodes and to and from the external circuit. An exemplary current collector is a stainless steel mesh for placement in contact with an electrode.

A cation exchange membrane is disposed between an anode and a cathode in an embodiment of an inventive fuel cell configuration. A suitable cation exchange membrane material is a proton conducting material exemplified by perfluorinated sulfonic acid polymers such as copolymers of tetrafluoroethylene and perfluorovinylether sulfonic acid and derivatives, including NAFION and derivatives produced by E.I. du Pont de Nemours & Co. Wilmington, Del.

A fuel cell according to the present invention is configured for operation in "batch" mode and/or in continuous flow mode. A medium containing a bio-oxidizable organic material is delivered to microbes on the anode periodically in a "batch" or continuously over a period of time. Similarly, the medium depleted of bio-oxidizable organic material may be removed periodically or continuously. Thus, a fuel cell is configured to include appropriate inlet and/or outlet passages in fluid communication with an anode chamber for delivery of a medium containing and/or depleted of a bio-oxidizable organic material to microbes disposed on the anode.

In particular embodiments, a cathode is immersed in liquid in a cathode compartment. The cathode compartment may be sparged with a gas, such as air or oxygen via an appropriate inlet passage and air and/or unreduced oxygen may be removed via the inlet passage and/or a separate outlet passage.

A microbial fuel cell according to the present invention is optionally configured to include at least one anode compartment and at least one cathode compartment, the anode and cathode compartments separated by a cation exchange membrane.

Electricigens included in a fuel cell according to the present invention are anaerobes. Thus, oxygen is preferably substantially excluded from the anode chamber. For example, an inert gas, such as nitrogen, is optionally introduced into the anode chamber to reduce or eliminate oxygen therein. In embodiments in which an air cathode is included, a barrier to substantial oxygen entry into the anode chamber via the air cathode is optionally included. For example, a cation exchange membrane which is substantially impermeable to oxygen is optionally used.

Optionally, more than one anode, cathode and cation exchange membrane is included in an inventive fuel cell.

Embodiments of inventive compositions and methods are illustrated in the following examples. These examples are provided for illustrative purposes and are not considered limitations on the scope of inventive apparatus and methods.

EXAMPLES

Example 1

Bacterial Culture

*Geobacter sulfurreducens* strain PCA is used. The inoculum for the fuel cells is grown at 30° C. *G. sulfurreducens* is grown with 10 mM acetate as the electron donor in either 55 mM Fe(II) citrate freshwater medium or in modified NBAF medium.

The 55 mM Fe(II) citrate freshwater medium includes the following constituents (in grams per liter of deionized water): $NaHCO_3$, 2.5; $CaCl_2$ $2H_2O$, 0.1; KCl, 0.1; $NH_4Cl$, 1.5; $NaH_2PO_4.H_2O$, 0.6; NaCl, 0.1; $MgCl_2$ $6H_2O$, 0.1; $MgSO_4.7H_2O$, 0.1; $MnCl_2.4H_2O$, 0.005; $NaMoO_4.2H_2O$, 0.001; $NaCH_3COO$, 2.7; and yeast extract (BL Microbiology Systems, Cockeysville, Md.), 0.05. The gas phase is $N_2$—$CO_2$ (80:20).

Modified NBAF medium is regular NBAF medium with resazuin omitted and with 1.3 mM Fe(II) chloride added. Regular NBAF medium contains 15 mM acetate as the electron donor and 40 mM fumarate as the electron acceptor. Its composition per liter of deionized water is 0.42 g of $KH_2PO_4$, 0.22 g of $K_2HPO_4$, 0.2 g of $NH_4Cl$, 0.38 g of KCl, 0.36 g of NaCl, 0.04 g of $CaC_2.2H_2O$, 0.1 g of $MgSO_4.7H_2O$, 1.8 g of $NaHCO_3$, 0.5 g of $Na_2CO_3$, 2.04 g of $NaC_2H3O2$. $3H_2O$, 6.4 g of $Na_2C_4H_4O_4$, 0.5 ml of 0.1% resazurin, 1.0 ml of 100 mM $Na_2SeO_4$, 10.0 ml of a vitamin solution (17), and 10.0 ml of NB trace mineral solution. The composition of the NB trace mineral solution per liter of deionized water is 2.14 g of nitriloacetic acid, 0.1 g of $MCl_2.4H_2O$, 0.3 g of $FeSO_4.7H_2O$, 0.17 g of $CoCl_2.6H_2O$, 0.2 g of $ZnSO_4.7H_2O$, 0.3 g of $CuCl_2.2H_2O$, 0.005 g of $AlK(SO_4)_2.12H_2O$, 0.005 g of $H_3BO_3$, 0.09 g of $Na_2MoO_4$, 0.11 g of $NiSO_4.6H_2O$, and 0.2 g of $Na_2WO_4.2H_2O$.

Example 2

Growth of Bacteria in Fuel Cells

A ministack fuel cell such as shown in FIG. 1 is used in this example. In this particular embodiment the anode and cathode volumes are each 7 mL. Gaskets are butyl rubber. The anode and cathode chambers are separated with a cation selective Nafion 117 membrane.

Anodes having sizes in the range of about 2.54 cm²×2.54 cm² to 1.16 cm²×12.9 cm² are graphite cloth grade GC-14, Electrolytica, Amherst, N.Y. Nominal surface area of the anodes is calculated using both sides of the graphite cloth.

Air breathing cathodes are Nafion 117 fused with a platinated substrate having a size of 2.54 cm²×2.54 cm². Cathode loading is 4.0 Pt mg/cm² of the substrate. In some instances the cathode is graphite cloth, having a size of 2.54 cm²×2.54 cm², submerged in 50 mM ferricyanide.

In particular experiments, the anode is poised at 300 mV with a potentiostat, Amel Instruments, Milan, Italy. The counter electrode is carbon cloth submerged in the freshwater medium.

Connections are with either platinum or stainless steel wires, both of 0.25 mm dia. A 560 ohm resistor is placed in the anode-cathode circuit, unless otherwise noted.

The anode and cathode chambers are sterilized by UV irradiation, then flushed with 1 liter of sterile water, filled with acetate-fumarate medium and connected to a 200 ml acetate-fumarate medium reservoir that recirculates medium through the anode chamber at a dilution rate of $0.85 \text{ h}^{-1}$. Growth of the bacterial culture is determined by measuring absorbance at 600 nm ($A_{600}$). Once the culture $A_{600}$ reaches 0.2 the media reservoir is replaced with medium containing acetate, but no fumarate. Once current production begins the medium is no longer recirculated and new medium is continuously supplied to the anode chamber at a dilution rate of $0.17 \text{ h}^{-1}$.

Fuel cell voltage is measured across the resistor with a Keithley datalogger connected to a Computer running Excelinc. Current measurements are collected directly from potentiosat outputs every second with a Power Lab 4SP connected to a Macintosh computer, and data is logged with Chart 5.0 software, ADI instruments, Mountain View, Calif.

Example 3

Bacterial Protein Analysis

To extract protein from electrodes, the entire carbon cloth anode is removed and Tyophilized. The surface of graphite sticks are scraped with a razor blade in 20 mL of isotonic wash buffer described in J. E. Butler et al., J. Bacteriology, 2004, 186:4042-4045, modified to replace the bicarbonate with MOPS. The scrapings are centrifuged at 4,000 rpm for 15 minutes and the pellet is lyophilized. The carbon cloth or graphite scraping are placed in 2-20 mL of 5% SDS and then vortexed (2 min), sonicated 1 min), and steamed (5 min). For planktonic biomass, the entire anode volume is collected via centrifugation at 4,000 rpm for 15 minutes. Protein is measured with the bicinchoninic acid method using reagents supplied by Sigma, St. Louis, Mo.

Example 3

Reactant Analysis

Acetate and other organic acids are determined via HPLC with a fast-acid column available commercially from Bio-Rad, Hercules, Calif., with an eluent of 8 mm H2SO4 and UV detection at 210 nm. Fe(II) is measured via the ferrozine method as described in Stookey, L. L., 1970, Analytical Chemistry, 42:779-781.

Example 4

Confocal Microscopy

In order to examine biofilms on the anode surfaces the fuel cells are disassembled and the carbon cloth anode removed without touching its surface. Anodes are then dipped in freshwater medium to remove any loose cells or debris that is not part of the attached biofilm. Anode biofilms are fluorescently stained with the LIVE/DEAD BacLight Bacterial Viability Kit L7012 available commercially from Molecular Probes, Inc., Eugene, Oreg. Manufacturer's instructions are followed with the following exceptions: dyes are mixed in freshwater medium rather than bacterial suspension, and, after the incubation step, samples are soaked again in freshwater media for five minutes to remove excess dye. After staining and while still wet, anodes are placed gently, so as not to disturb the biofilm, onto a few drops of ProLong Antifade agent P7481 available commercially from Molecular Probes, Inc., Eugene, Oreg., that had been added to the surface of a glass coverslip. Biofilm structures are examined with confocal laser scanning microscopy (CLSM) with a Zeiss LSM510 Meta inverted microscope equipped with a 10×, 25×, 40×, or 63× objective lens. Two- and three-dimensional images are prepared and biofilm thicknesses are calculated using the Zeiss LSM Image Browser v.4.0.0.157. For each sample, average biofilm thickness is calculated by examining between two and seven fields of view and measuring the biofilm along each observable carbon cloth fiber at at least three points.

Example 5

Substantially Pure Population of *Geobacter sulfurreducens* on the Anode

Figure 2A:
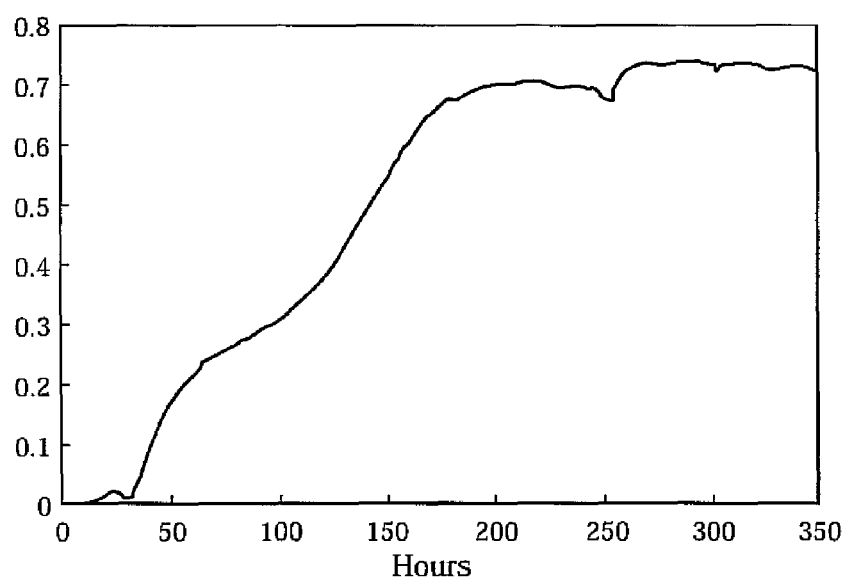
FIG. 2A is a graph showing an increase in current over time that stabilized at ca. 0.75 mA, 0.58 A/m$^2$, following inoculation of Geobacter sulfurreducens into a fuel cell having a platinum loaded air cathode.
Figure 2B:
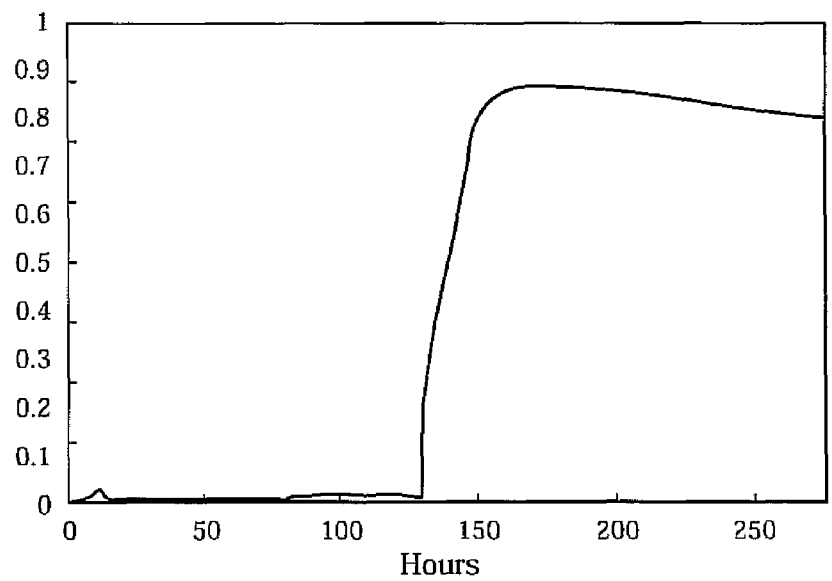
FIG. 2B is a graph showing current over time in a fuel cell including Geobacter sulfurreducens on the anode and with a carbon cloth cathode and a cathode chamber filled with 50 mM ferric cyanide, where current production is 0.9 mA; 0.7 A/M$^2$.

When *Geobacter sulfurreducens* is inoculated into the ministack fuel cell described in Example 2 with an air cathode there is an increase in current over time that stabilized at ca. 0.75 mA which is equivalent to 0.58 A/m² as shown in FIG. 2A. Once the maximum current is reached it could be maintained indefinitely as long as fuel is provided to the anode chamber When the platinum loaded air cathode is replaced with carbon cloth and the cathode chamber is filled with 50 mM ferric cyanide, current production is 0.9 mA; 0.7 A/m² as shown in FIG. 2B. These data show that a substantially pure population of *G. sulfurreducens* on the anode allows for transfer of electrons to the anode. Comparison of the air cathode fuel cell configuration with a fuel cell having solid electron acceptor at the cathode suggests an electrochemical basis for differences between these two fuel cells, rather than limitation due to a substantially pure population of *G. sulfurreducens* on the anode.

Example 6

Relative Electrode Sizes

Figure 3:
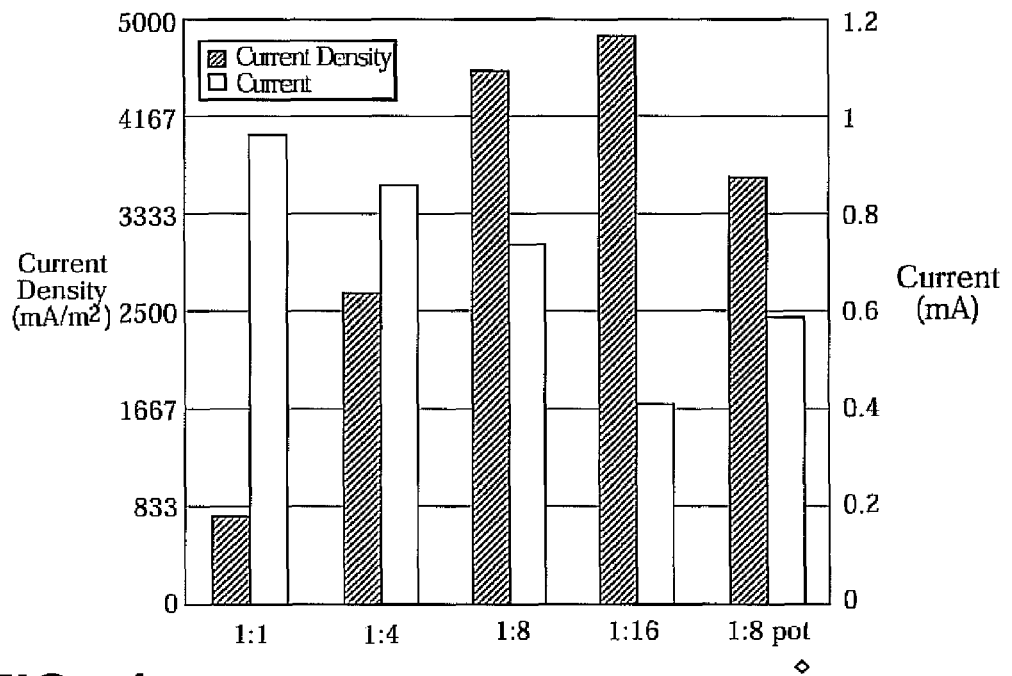
FIG. 3 is a graph showing the effect on current and current density of varying the ratio of anode size and cathode size.

The size of the anode is varied in systems in which the cathode is the ferric cyanide system and as shown in FIG. 3, the size of the anode relates directly to the total current produced. However, the current density increases until the anode is $\frac{1}{8}^{th}$ of the original size tested. At this $\frac{1}{8}^{th}$ size, the current density is comparable to that observed when the anode is poised with a potentiostat. Similar current densities with the $\frac{1}{8}^{th}$-sized anode are also observed when an air cathode is substituted for the ferric cyanide-filled cathode chamber. The current density of 4.56 A/m² in this non-cathode limited system with 560 ohm external resistance represents a power density of 1.88 W/m² and a power per anode chamber volume of 43 W/M³.

Example 7

Voltage and fumarate Power Production

Figure 4:
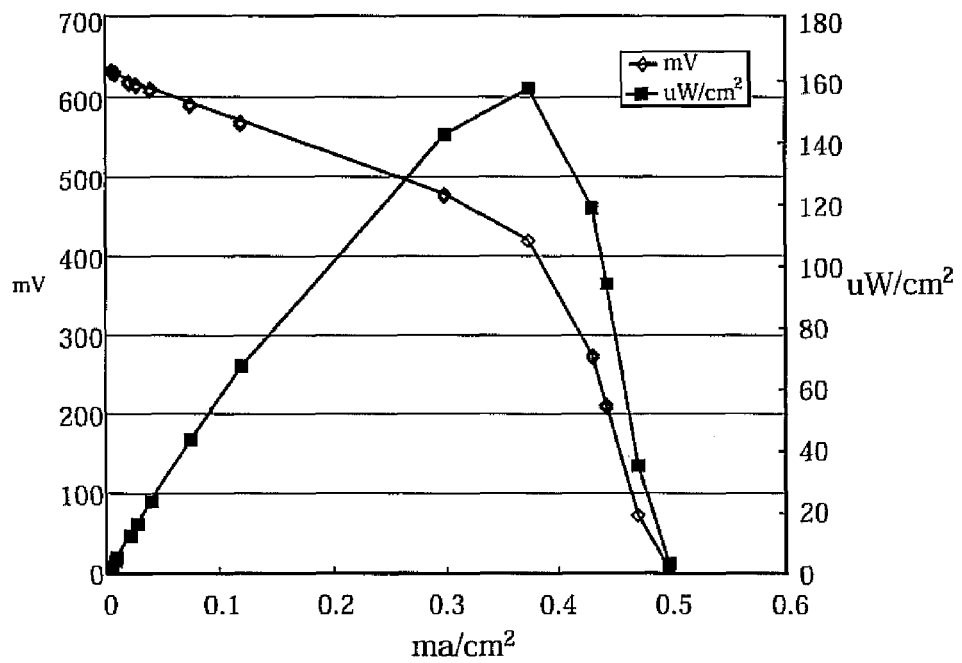
FIG. 4 is a graph showing voltage and power production in an FeCN cathode configuration of a fuel cell determined across a range of external resistances.

Voltage and power production in the FeCN cathode configuration of a fuel cell is determined across a range of external resistances, 10-100000 ohms, is shown in FIG. 4. Maximal power density is at 700 ohms resistance, quite close to the external resistance of 560 ohms at which the cells had initially been grown and acclimated.

Example 8

Efficiency

Once the ministack fuel cells stabilize at maximum power, acetate concentrations in the effluent remain stable over time at ca. 8.8 mM, making it possible to calculate a rate of acetate consumption from the difference in acetate concentrations in the influent and effluent and the flow rate of the acetate feed. Comparison of acetate consumption and electrons being recovered as electricity indicated that 55% of the electrons from the acetate being consumed are converted to electricity when a FeCN cathode is used. In order to determine what proportion of acetate consumed not recovered as electricity might be attributed to incorporation of acetate into microbial cells over time, the acetate feed is switched from growth medium to bicarbonate buffer to prevent cell growth. Under these conditions, 65% of the electrons in the acetate consumed are recovered as current. To evaluate the potential impact of oxygen leaking into the anode chambers, the ministacks are placed in an anaerobic chamber. Under these conditions efficiencies are ca. 100% in the presence of growth medium or buffer.

Example 8

Anode Biofilm Characterization

Biofilms of a substantially pure population of *Geobacter sulfurreducens* completely coat the fibers of the carbon cloth anodes in ministack configuration fuel cells as described in Examples herein. The biofilms on the full-sized anodes are confluent layers 2.2-8.5 microns thick. When cathode limitation is eliminated with the $\frac{1}{8}^{th}$-sized anodes, the biofilms are thicker, 3-18 microns, than on the full-sized anodes. Like the biofilms in the cathode-limited system, the biofilms in the system without cathode limitation are relatively uniform. However, in some instances small pillars of about 10 microns maximum height, are observed, primarily in regions where the biofilm had overgrown the spaces between the carbon fibers.

In Beer experiments, a ministack fuel cell having a solid graphite stick anode having dimensions of 0.635 cm×1.27 cm, is compared with a ministack fuel cell having a $\frac{1}{8}^{th}$-sized carbon cloth anode of the same dimensions. The current density achieved with the solid graphite stick anode is 3.1 A/m². The biofilms on the solid graphite anode are highly differentiated with pillars ca. 50 microns in thickness.

Example 9

Comparison of "H-Cell" and "Ministack" Fuel Cell Configurations

Figures 5, 6:
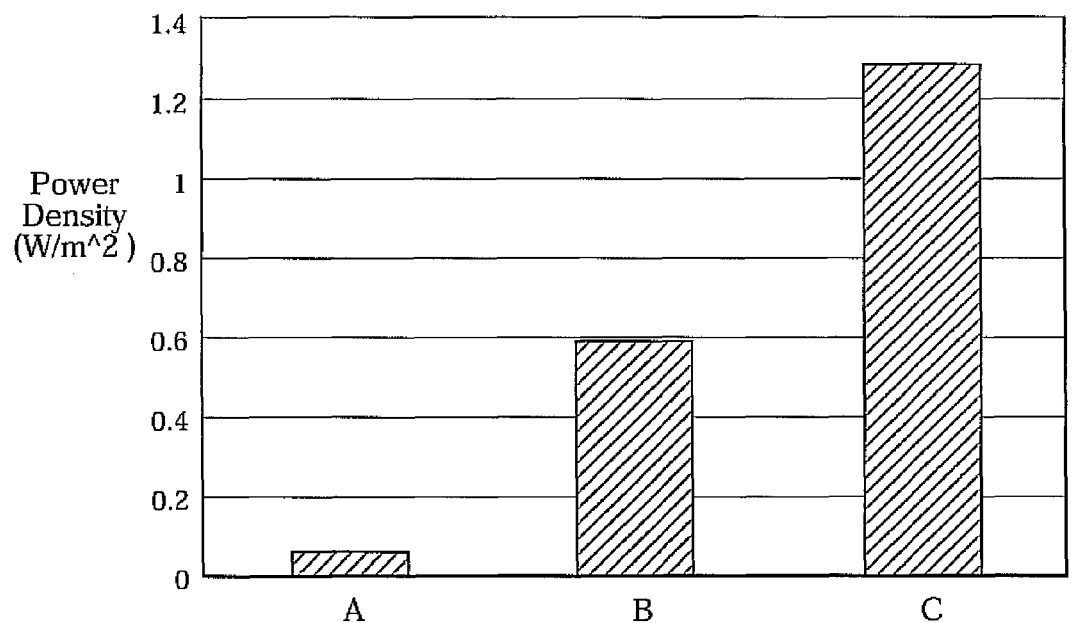
FIG. 5 is a graph showing power density obtained using a single chamber fuel cell with an air cathode, B, as well as a fuel cell having a double chamber, solid electron acceptor in the cathode compartment configuration, C, compared to an H-cell configuration, A.
FIG. 6 is a table showing current density and power density obtained in fuel cells according to embodiments of the present invention having either air cathode or with a solid electron acceptor at the cathode compared to an H-cell configuration.

An "H-cell" fuel cell is a two chamber fuel cell wherein the two chambers are connected by a bridge having a cation exchange membrane disposed in the bridge. The bridge has a height less than the height of the two chambers such that the resulting fuel cell has the appearance of the letter "H." Comparision of "H-cell" and "ministack" fuel cell configurations demonstrates that void volume/weight is reduced in the ministack fuel cell of the present invention, improving current and power density with both air cathode and with a solid electron acceptor at the cathode. FIG. 5 illustrates increased power density using either the single chamber ministack air cathode 1B, as well as the double chamber solid electron acceptor, FeCN, in the cathode compartment configuration, C, compared to an H-cell configuration, A. FIG. 6 illustrates both improved current density and improved power density using ministack fuel cells having either air cathode or with a solid electron acceptor at the cathode compared to an H-cell configuration.

Example 10

Continuous Operation

Figure 7:
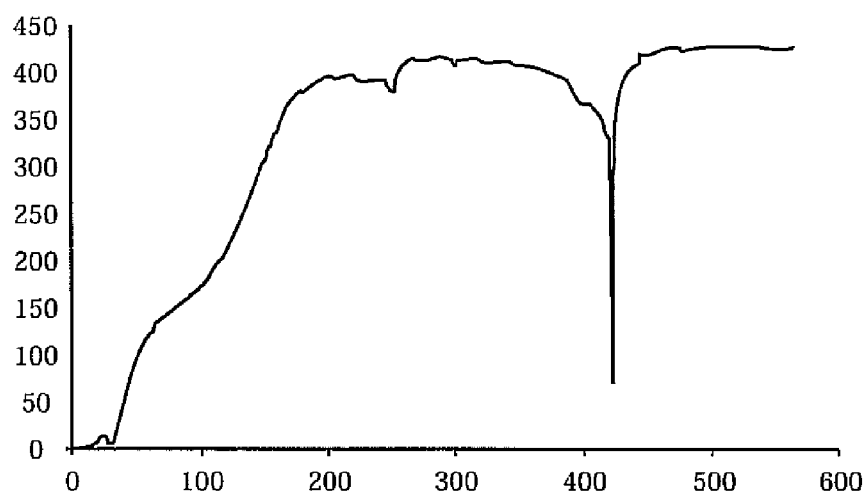
FIG. 7 is a graph showing current produced over time in all embodiment of a fuel cell according to the present invention having a substantially pure population of Geobacter sulfurreducens on the anode.

FIG. 7 shows current produced over time in a ministack configuration having a substantially pure population of *Geobacter sulfurreducens* on the anode where the fuel cell is operated in "batch" mode. The anodic electrolyte present from time 0 for about 400 hours is replaced with fresh anodic electrolyte at about 400 hours. It is noted that following this change of medium, current production dips and then quickly rises to previous levels or higher indicating that the microbial population on the anode is neither washed away nor harmed by the medium change. A microbial fuel cell according to the present invention is self-sustaining as long as supplied with oxidizable organic material (10 mM acetate) and should therefore operate for years.

Example 11

Continuous Operation

Figure 8:
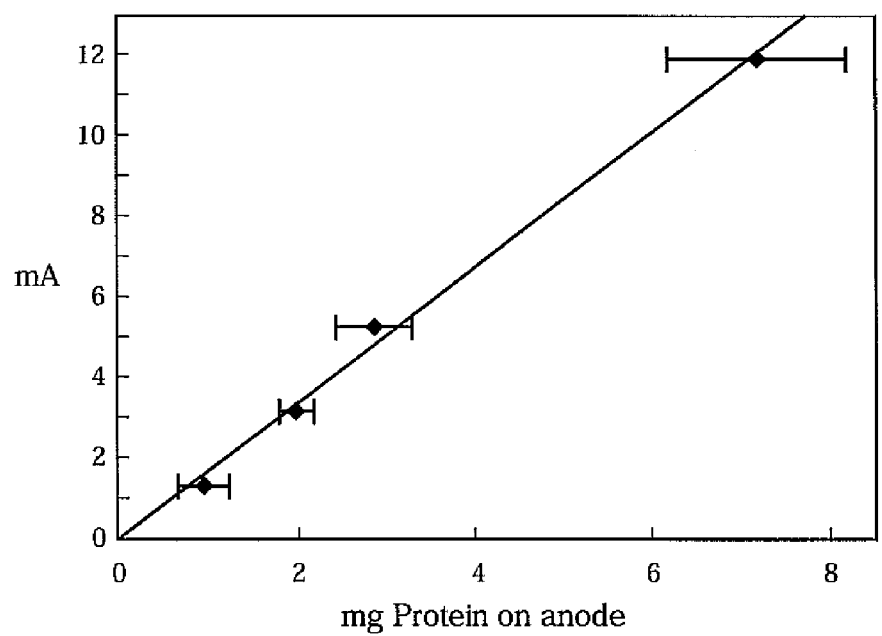
FIG. 8 is a graph showing a direct relationship between current production and the amount of microbial protein on the anode.

FIG. 8 shows a direct relationship between current production and the amount of microbial protein, that is, the number of microbes, on the anode.

Any patents or publications mentioned in this specification are incorporated herein by reference to the same extent as if each individual publication is specifically and individually indicated to be incorporated by reference.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:
1. A microbial fuel cell, comprising:
an anode having an anode surface area, a cathode having a cathode surface area, a cation exchange membrane disposed between the anode and the cathode, and a plurality of electricigenic microbes disposed on the anode wherein the plurality of electricigenic microbes includes 0.075 milligrams of microbial protein or greater per square centimeter of the anode surface area, the plurality of electricigenic microbes forming a plurality of colonies spaced from each other in an amount greater than zero and up to 40 microns improving a mass transfer of the plurality of electricigenic microbes increasing a power density of the microbial fuel cell wherein the fuel cell has a power density of from 100 mA/m² to 4.56 A/m² and operates at a duration of greater than 24 hours.
2. The microbial fuel cell of claim 1 wherein the colonies form pillar structures having a height of from 20 to 50 microns.

3. The microbial fuel cell of claim 1 wherein the plurality of electricigenic microbes form a biofilm having a thickness greater than 1 micron.

4. The microbial fuel cell of claim 1 wherein the plurality of electricigenic microbes form pili allowing electron transport between the plurality of electricigenic microbes.

5. The microbial fuel cell of claim 1 wherein the plurality of electricigenic microbes is Geobacteraceae.

6. The microbial fuel cell of claim 1 wherein the plurality of electricigenic microbes is a substantially pure population of electricigenic microbes.

7. The microbial fuel cell of claim 6 wherein the plurality of electricigenic microbes is a substantially pure population of *Geobacter sulfurreducens*.

8. The microbial fuel cell of claim 1 wherein the cathode is an air cathode.

9. The microbial fuel cell of claim 1 wherein the anode is substantially non-toxic to the plurality of microbes.

10. The microbial fuel cell of claim 1 wherein the anode is selected from:
   graphite, porous graphite, packed graphite powder, carbon cloth, carbon felt, carbon paper, carbon wool, a conductive metal, a conductive polymer and combinations of any of these.

11. A microbial fuel cell, comprising:
   an anode having an anode surface area, a cathode having a cathode surface area, a cation exchange membrane disposed between the anode and the cathode, and a plurality of electricigenic microbes disposed on the anode wherein the plurality of electricigenic microbes includes 0.075 milligrams of microbial protein or greater per square centimeter of the anode surface area, the plurality of electricigenic microbes forming a plurality of colonies having pillars spaced from each other in an amount greater than zero and up to 40 microns improving a mass transfer of the plurality of electricigenic microbes increasing a power density of the microbial fuel cell wherein the fuel cell has a power density of from 100 $mA/m^2$ to 4.56 A/m and operates at a duration of greater than 24 hours.

12. A microbial fuel cell, comprising:
   an anode having an anode surface area, a cathode having a cathode surface area, a cation exchange membrane disposed between the anode and the cathode, and a plurality of electricigenic microbes disposed on the anode wherein the plurality of electricigenic microbes includes 0.075 milligrams of microbial protein or greater per square centimeter of the anode surface area, the plurality of electricigenic microbes forming a plurality of colonies spaced from each other in an amount greater than zero and up to 40 microns improving a mass transfer of the plurality of electricigenic microbes increasing a power density of the microbial fuel cell and wherein the plurality of electricigenic microbes form a bio film having a thickness greater than one micron wherein the fuel cell has a power density of from 100 $mA/m^2$ to 4.56 A/m and operates at a duration of greater than 24 hours.

* * * * *

UNITED STATES PATENT AND TRADEMARK OFFICE
CERTIFICATE OF CORRECTION

PATENT NO. : 8,283,076 B2  Page 1 of 2
APPLICATION NO. : 11/750583
DATED : October 9, 2012
INVENTOR(S) : Derek R. Lovley et al.

It is certified that error appears in the above-identified patent and that said Letters Patent is hereby corrected as shown below:

In the Specification:

At column 2, line number 9, Delete "A/M$^{2}$", Insert --A/m$^{2}$--

At column 2, line number 62, Delete "24H$^{++}$24e$^{-}$", Insert --24H$^{+}$+24e--

At column 8, line number 31, Delete "(II)", Insert --(III)--

At column 8, line number 33, Delete "(II)", Insert --(III)--

At column 8, line number 36, Delete "NaH$_2$PO$_4$.H$_2$O", Insert --NaH$_2$PO$_4$•H$_2$0--

At column 8, line number 37, Delete "MgSO$_4$.7H$_2$0", Insert --MgSO$_4$•7H$_2$0--

At column 8, line number 37, Delete "MnCl$_2$.4H$_2$0", Insert --MnCl$_2$•4H$_2$0--

At column 8, line number 37, Delete "NaMoO$_4$-.2H$_2$0", Insert --NaMoO$_4$-•2H$_2$0--

At column 8, line number 47, Delete "CaC$_2$. 2H$_2$O", Insert --CaCl$_2$ • 2H$_2$O--

At column 8, line number 48, Delete "NaC$_2$H3O2.3H$_2$O", Insert --NaC$_2$H3O2 • 3H$_2$O--

At column 8, line number 53, Delete "MCl$_2$.4H$_2$O", Insert --MCl$_2$ • 4H$_2$O--

At column 8, line number 54, Delete "CoCl$_2$. 6H$_2$O", Insert --CoCl$_2$ • 6H$_2$O--

At column 8, line number 54, Delete "ZnSO$_4$.7H$_2$O", Insert --ZnSO$_4$ • 7H$_2$O--

At column 8, line number 54, Delete "CuCl$_2$.2H$_2$O", Insert --CuCl$_2$ • 2H$_2$O--

At column 8, line number 55, Delete "AlK(SO$_4$)$_2$.12H$_2$O", Insert --AlK(SO$_4$)$_2$ • 12H$_2$O--

At column 8, line number 56, Delete "NiSO$_4$.6H$_2$O", Insert --NiSO$_4$ • 6H$_2$O--

Signed and Sealed this
Twenty-fourth Day of December, 2013

Margaret A. Focarino
*Commissioner for Patents of the United States Patent and Trademark Office*

CERTIFICATE OF CORRECTION (continued)
U.S. Pat. No. 8,283,076 B2

At column 8, line number 57, Delete "$Na_2WO_4.2H_2O$", Insert --$Na_2WO_4 \cdot 2H_2O$--

At column 9, line number 38, Delete "Tyophilized", Insert --Lyophilized--

At column 10, line number 6, Delete "Oreg.", Insert --OR.--

At column 10, line number 13, Delete "Oreg.,", Insert --OR.,--

At column 10, line number 61, Delete "$W/M^3$", Insert --$W/m^3$--

At column 10, line number 63, Delete "fumarate"

At column 12, line number 4, Delete "1B", Insert --,B--